(12) United States Patent
Lee et al.

(10) Patent No.: US 7,984,013 B2
(45) Date of Patent: Jul. 19, 2011

(54) METHOD AND APPARATUS FOR LEARNING BEHAVIOR IN SOFTWARE ROBOT

(75) Inventors: Kang-Hee Lee, Seoul (KR);
Kwang-Choon Kim, Suwon-si (KR);
Ye-Hoon Kim, Daejeon (KR);
Jong-Hwan Kim, Daejeon (KR);
Se-Hyoung Cho, Daejeon (KR);
Seung-Hwan Cho, Daejeon (KR)

(73) Assignee: Samsung Electronics Co., Ltd (KR)

( * ) Notice: Subject to any disclaimer, the term of this patent is extended or adjusted under 35 U.S.C. 154(b) by 833 days.

(21) Appl. No.: 12/026,244

(22) Filed: Feb. 5, 2008

(65) Prior Publication Data
US 2008/0208776 A1 Aug. 28, 2008

(30) Foreign Application Priority Data

Feb. 7, 2007 (KR) .................. 10-2007-0012951
Jun. 21, 2007 (KR) .................. 10-2007-0061095

(51) Int. Cl.
*G06F 15/18* (2006.01)
(52) U.S. Cl. ............ 706/62; 706/12; 706/13; 706/14; 706/45
(58) Field of Classification Search .................. None
See application file for complete search history.

(56) References Cited

U.S. PATENT DOCUMENTS

| 7,499,893 B2 * | 3/2009 | Czora | 706/18 |
| 2008/0018690 A1 * | 1/2008 | Nishida | 347/18 |
| 2008/0256008 A1 * | 10/2008 | Kwok | 706/20 |

FOREIGN PATENT DOCUMENTS

JP 2004-283960 10/2004
(Continued)

OTHER PUBLICATIONS

Kim et al. "Incorporation of a Software Robot and a Mobile Robot Using a Middle Layer", IEEE Transactions on Systems, Man and Cybernetics—Part C: Applications and Reviews, vol. 37, No. 6, Nov. 2007, pp. 1342-1348.*

(Continued)

*Primary Examiner* — Omar F Fernandez Rivas
(74) *Attorney, Agent, or Firm* — The Farrell Law Firm, P.C.

(57) ABSTRACT

Disclosed is a method and apparatus for learning behavior in a software robot. The method includes detecting a kind of an object in cyberspace related to a kind of presently manifested action, and a kind and the variation of at least one state among percept states or emotional states preset so as to change in relation to the kind of the action; finding episodes respectively corresponding to each of one or more objects in the cyberspace, each of one or more emotional states and each of one or more percept states, respectively defined in the software robot, a kind of an object in cyberspace related to the detected kind of the action among multiple episodes for responding a combination of kinds of respective one or more actions and for storing variation related to each state, and a kind of at least one state among percept states or emotional states preset so as to change in relation to the kind of the action; using variation stored in response to the found episode and variation generated in response to the manifested action, and calculating a representative variation; and storing the representative variation as a variation of the found episode.

12 Claims, 4 Drawing Sheets

FOREIGN PATENT DOCUMENTS

| JP | 2004-291228 | 10/2004 |
|----|-------------|---------|
| JP | 2005-313308 | 11/2005 |
| KR | 1020010041969 | 5/2001 |

OTHER PUBLICATIONS

Kim et al. "The Origin of Artificial Species: Genetic Robot", International Journal of Control, Automation, and Systems, vol. 3, No. 4, Dec. 2005, pp. 564-570.*

Kim et al. "Ubiquitous Robot: The Third Generation of Robotics", Proceeding of the Second American University of Sharjah International Symposium on Mechatronics, Sharjah, U.A.E. Apr. 2005, 8 pages.*

Kuppuswamy et al. "A Cognitive Architecture for an artificial Creature Using Episodic Memory", SICE-ICASE International Joint Conference, 2006, pp. 3104-3110.*

\* cited by examiner

| EAT | OBJECT 1 | PERCEPTION | HUNGER | -10 | 1 |
|---|---|---|---|---|---|
| EAT | OBJECT 2 | PERCEPTION | HUNGER | -12 | 1 |
| EAT | OBJECT 2 | EMOTION | SADNESS | -5 | 1 |
| EAT | OBJECT 1 | EMOTION | HAPPINESS | 10 | 1 |
| HOLD OBJECT IN MOUTH | OBJECT 3 | EMOTION | FEAR | 15 | 1 |
| HOLD OBJECT IN MOUTH | OBJECT 4 | EMOTION | HAPPINESS | -8 | 1 |

FIG.4A

| EAT | OBJECT 1 | PERCEPTION | HUNGER | -20 |
|---|---|---|---|---|

FIG.4B

| EAT | OBJECT 1 | PERCEPTION | HUNGER | -11 | 2 |
|---|---|---|---|---|---|
| EAT | OBJECT 2 | PERCEPTION | HUNGER | -12 | 1 |
| EAT | OBJECT 2 | EMOTION | SADNESS | -5 | 1 |
| EAT | OBJECT 1 | EMOTION | HAPPINESS | 10 | 1 |
| HOLD OBJECT IN MOUTH | OBJECT 3 | EMOTION | FEAR | 15 | 1 |
| HOLD OBJECT IN MOUTH | OBJECT 4 | EMOTION | HAPPINESS | -8 | 1 |

METHOD AND APPARATUS FOR LEARNING BEHAVIOR IN SOFTWARE ROBOT

PRIORITY

This application claims priority under 35 U.S.C. §119(a) to an application entitled "Method and Apparatus for Learning Behavior in Software Robot" filed in the Korean Industrial Property Office on Feb. 7, 2007 and assigned Serial No. 2007-0012951, and also to an application filed in the Korean Industrial Property Office on Jun. 21, 2007 and assigned Serial No. 2007-0061095, the contents of which are incorporated herein by reference.

BACKGROUND OF THE INVENTION

1. Field of the Invention

The present invention relates to a genetic robot, and more particularly to a method and an apparatus for learning behavior (i.e., actions) in a software robot among genetic robots.

2. Description of the Related Art

In general, a genetic robot refers either to an artificial creature having a genetic code of its own, to a software robot (i.e., a sobot), or to a general robot. Also, a robot genetic code signifies a single robot genome consisting of multiple artificial chromosomes. Herein, the software robot refers to an artificial creature having a software form which, transferring through a network, can now interact with a user as an independent software agent, and can again act as an intelligent unit of a robot that connects a hardware robot with a sensor network.

The multiple artificial chromosomes defined in the above-mentioned software robot, interacting with an environment outside of the robot, define a change of internal states consisting of motivation, homeostasis, emotional states, etc., inside of the robot, and individuality or personality peculiar to the robot determining manifested behavior accompanied by the change of internal states. Herein, the definition of an artificial creature, motivation, homeostasis, emotions, behavior, and the like is as shown in TABLE 1.

TABLE 1

| | |
|---|---|
| artificial creature | An artificial creature acts on the motivation of a robot itself, has emotions, and can select its behavior, interacting with a human being in real time. |
| individuality | It is not a simple and summarized technique of behavior, but a determiner of a part or the whole thereof, and may be construed as personality if it is thought of as a human being. This concept includes motivation, homeostasis and emotions. Therefore, an individuality engine means an engine having all of motivation, homeostasis and emotions. It corresponds to a determiner that brings about various kinds of internal states and behavior manifestations. |
| motivation | A process which causes a living body to arouse and keep activities thereof, and to control the pattern of the activities thereof. It causes selecting and performing behavior. For example, curiosity, feelings of intimacy, boredom, evasive desire, possessiveness, and the like. |
| homeostasis | A function which enables a living body to keep a physiological state as an individual stable even though it is affected by changes of external and internal environments. It causes selecting and performing behavior. For instance, hunger, sleepiness, fatigue, and the like. |
| emotions | Subjective restlessness induced when a living body takes a certain behavior. For example, happiness, sadness, anger, fear, and the like. |
| behavior | The general term for an individual's actions, including moving to a specific spot, stopping, and the like. For instance, in the case of animals, sleeping, feeding, running, and the like. The number of kinds of actions that an individual can select is limited, and in a certain instant, each individual can execute only one behavior. |

In addition, the above artificial chromosome can be divided into genetic information related to essential elements, genetic information related to internal states, and genetic information related to behavior determination. Herein, the genetic information related to essential elements refers to essential parameters which have a great effect on the change of internal states and external behavior manifestation, and the genetic information related to internal states refers to parameters which affect internal states of a robot in relation to an external input applied to the robot. Furthermore, the genetic information related to behavior determination refers to parameters which determine external behavior related to the above internal states, depending on currently determined internal states.

Herein, the internal states refers to states such as motivation, homeostasis, emotions, and the like. Therefore, the internal states of the robot, as shown in TABLE 2, can be determined by respective internal states, and by parameters of internal states, depending on respective external stimuli, i.e., by the genetic information related to internal states.

TABLE 2

| | internal states | | | | | | | |
|---|---|---|---|---|---|---|---|---|
| | motivation | | | | | | | |
| external stimuli | a feeling of intimacy | ... | a sense of hostility | homeostasis | | emotions | | |
| | | | | hunger | ... sleepiness | happiness | ... | sadness |
| pat | 80 | ... | −40 | 0 | ... 0 | 40 | ... | −20 |
| strike | −30 | ... | 50 | 0 | ... 0 | −30 | ... | 30 |
| surprising | 0 | ... | 5 | 0 | ... 0 | 10 | ... | 0 |
| ... | ... | ... | ... | ... | ... ... | ... | ... | ... |
| pacifying | 40 | ... | −40 | 0 | ... 0 | 50 | ... | −50 |

The genetic information related to behavior determination can be represented in the same manner as in TABLE 2, provided that it includes various manifestable actions in substitution for the above external stimuli. Therefore, the genetic information related to behavior determination includes parameters related to specific actions in regard to respective internal states, i.e. parameters of internal states, such as motivation, homeostasis and emotions, the values of which enable respective actions to manifest themselves.

Also, essential parameters which have a great effect on each change of these internal states and on external behavior manifestation, may be represented as: whether it is volatile, an initial value, the mean value, the convergence value, attenuation values as time elapses, a specific value determined by a specific time, and the like. The genetic information related to essential elements can configure these essential parameters for a special purpose. Hence, this genetic information related to essential elements includes: respective internal states, i.e. motivation, homeostasis, whether it is volatile depending on internal states of emotions, an initial value, the mean value, the convergence value, attenuation values, a specific value, and so on.

In this case, a robot genome consists of the genetic information related to essential elements, the genetic information related to internal states, and the genetic information related to behavior determination. The genetic information related to essential elements is made up of parameters of internal states, and parameters of elements which are essential to a change of internal states corresponding to each internal state and to external behavior manifestation. The genetic information related to internal states is made up of parameters of various external stimuli, and parameters of internal states respectively corresponding to the external stimuli. The genetic information related to behavior determination is made up of parameters of various manifested actions, and parameters of internal states respectively corresponding to the manifested actions. Therefore, as shown in TABLE 3 below, the robot genome can be represented through a two-dimensional matrix as genetic information related to respective internal states, essential elements respectively corresponding to the internal states, external stimuli, and manifested actions.

tions on time and space in a ubiquitous environment. In order to freely transfer over a network, the software robot must have an IP address of a device whose transition is enabled, and exist in an apparatus which is employed presently. So as to interact with the user of the apparatus, the software robot can perform the same functions as those of a real creature, i.e. selecting behavior by itself, adapting itself to its environment, expressing its emotions, and the like.

In order to adapt the software robot to its environment, it should be taught how to behave itself. When the software robot shows its response to an object of interest, a user gives the software robot a reward (i.e., praise) or penalty (i.e., a scolding). By doing this, when the next object of interest approaches, an inclination, such as whether it avoids or approaches the object of interest, can be changed. This is called "preference learning." The preference learning teaches the software robot its degree of preference corresponding to likes or dislikes to a certain object. For instance, if a user praises the software robot when it finds a yellow ball, by increasing happiness among emotional states and decreasing an evasive motivation state, its behavior and the intensity of connection between its relevant internal states can be adjusted.

Voice learning allows an action desired by a user to manifest itself among a set of similar actions determined in regard to user's arbitrary voice commands. The voice learning can teach behavior suitable for arbitrary commands among all actions, gradually decreasing a set of actions which becomes a learning goal, and reinforcing learning of results of actions by each set of similar actions. For example, a set of actions similar to 'Sit down' includes 'sitting', 'crouching' and 'lying

TABLE 3

| | | internal states | | |
|---|---|---|---|---|
| | | motivation | | |
| | | a feeling of intimacy ... a sense of hostility | homeostasis hunger ... sleepiness | emotions happiness ... sadness |
| essential elements | volatility an initial value ... attenuation values | a gene related to essential elements (motivation) | a gene related to essential elements (homeostasis) | a gene related to essential elements (emotions) |
| external stimuli | pat strike ... pacifying | a gene related to internal states (motivation) | a gene related to internal states (homeostasis) | a gene related to internal states (emotions) |
| manifested behavior | laughing looking around ... rolling | a gene related to behavior determination (motivation) | a gene related to behavior determination (homeostasis) | a gene related to behavior determination (emotions) |

Therefore, a current robot platform determines a specific manifested behavior based on current internal states, i.e. states such as motivation, homeostasis, emotions, and so on, and implements behavior accompanied by the determination. For example, if an internal state of a robot corresponds to a hungry state, the robot determines its behavior for importuning a man for something or other, and puts the determination into action. Accordingly, the robot can be embodied so as to act like an actual living being.

The software robot having characteristics as abovementioned should provide a user with services without restricdown', and a set of actions similar to 'Come here' includes 'pursuing', 'approaching', 'kicking' and 'touching.'

Since, in the learning function of the abovementioned prior software robot, behavior taught to the software robot is confined to a set of similar actions, and the software robot can be taught only some specific actions. Also, during reinforcement learning, a user had to give the software robot a reward or penalty for its behavior one by one. By using the learning methods of the prior art, learning emotions and motivation could be accomplished, but learning how to maintain homeostasis could not be attained.

SUMMARY OF THE INVENTION

Accordingly, the present invention has been made to solve the above-stated problems occurring in the prior art, and the present invention provides a method and an apparatus for learning connection relations between the actions and internal states of a software robot.

Further, the present invention provides a method and an apparatus capable of implementing learning between all possible actions and all internal states in a software robot.

Still further, the present invention provides a method and an apparatus in which, although a user does not give an artificial reward or penalty by means of feedback, each input that a software robot is able to perceive can be recognized as a reward or penalty in regard to learning.

Yet further, the present invention provides a method and an apparatus in which a software robot can learn actions related to physical states along with emotional states.

In order to accomplish these aspects of the present invention, there is provided a method according to the present invention, the method including detecting a kind of object in cyberspace related to a kind of presently manifested action, and a kind and the variation of at least one state among percept states or emotional states preset so as to change in relation to the kind of the action; finding episodes respectively corresponding to: each of one or more objects in the cyberspace, each of one or more emotional states and each of one or more percept states, respectively defined in the software robot, a kind of an object in cyberspace related to the detected kind of the action among multiple episodes for responding a combination of kinds of respective one or more actions and for storing variation related to each state, and a kind of at least one state among percept states or emotional states preset so as to change in relation to the kind of the action; using variation stored in response to the found episode and variation generated in response to the manifested action, and calculating a representative variation; and storing the representative variation as a variation of the found episode.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

A software robot exists in cyberspace based on its characteristics. In cyberspace where the software robot exists, one or more software robots may exist, together with various components, which can be expressed in the cyberspace, such as items, food, toys, chairs, and the like, may exist. In the present invention, the software robots and all of the components are called objects. Furthermore, in the cyberspace, other than the objects, environmental information, including environmental causes, position information of the objects, interaction information among the objects, etc., may exist. The environmental causes correspond to main causes representing environmental properties of the cyberspace, and may include temperature, humidity, time, the amount of sunshine, sound, spatial properties, and so forth. The position information of the objects denotes a stationary position of each object in the cyberspace, or a current position thereof which has moved thereto. The interaction information among the objects corresponds to information on interaction directly implemented among the objects, such as when the software robot eats food, or when it kicks a ball.

The environmental information may be delivered to the software robot. In general, the environmental causes and the position information of the objects are delivered to the software robot through a specific function, and the delivered environmental causes and position information of the objects can be sensed by a sensor unit of the software robot. The interaction information among the objects can be delivered to the software robot as an event, represented by a specific function.

An event function is necessary to deliver a case occurring in the cyberspace to the software robot, and includes identification information of an object affected by the case (who or whom), a kind of motion related to the case (what), and effects occurring due to the motion (parameters). In addition, the events can be classified into external events concerning interaction among objects different from one another, and internal events within a single object. The external event corresponds to an event representing the interaction among objects different from one another. For example, in a case where a software robot eats food, the objects correspond to the software robot and the food; the kind of motion corresponds to eating; and the effect occurring due to the motion can be a feeling of fullness and happiness after a meal. The internal event is necessary to handle influence which internally occurs due to the result of a certain action of the software robot. For instance, in a case where a software robot walks, the object related to the case corresponds to the software robot; the kind of motion corresponds to walking; and the effect occurring due to the motion can correspond to fatigue. The software robot can sense such an occurrence of the event through a sensor unit or a physical state unit and so forth.

Figure 1:
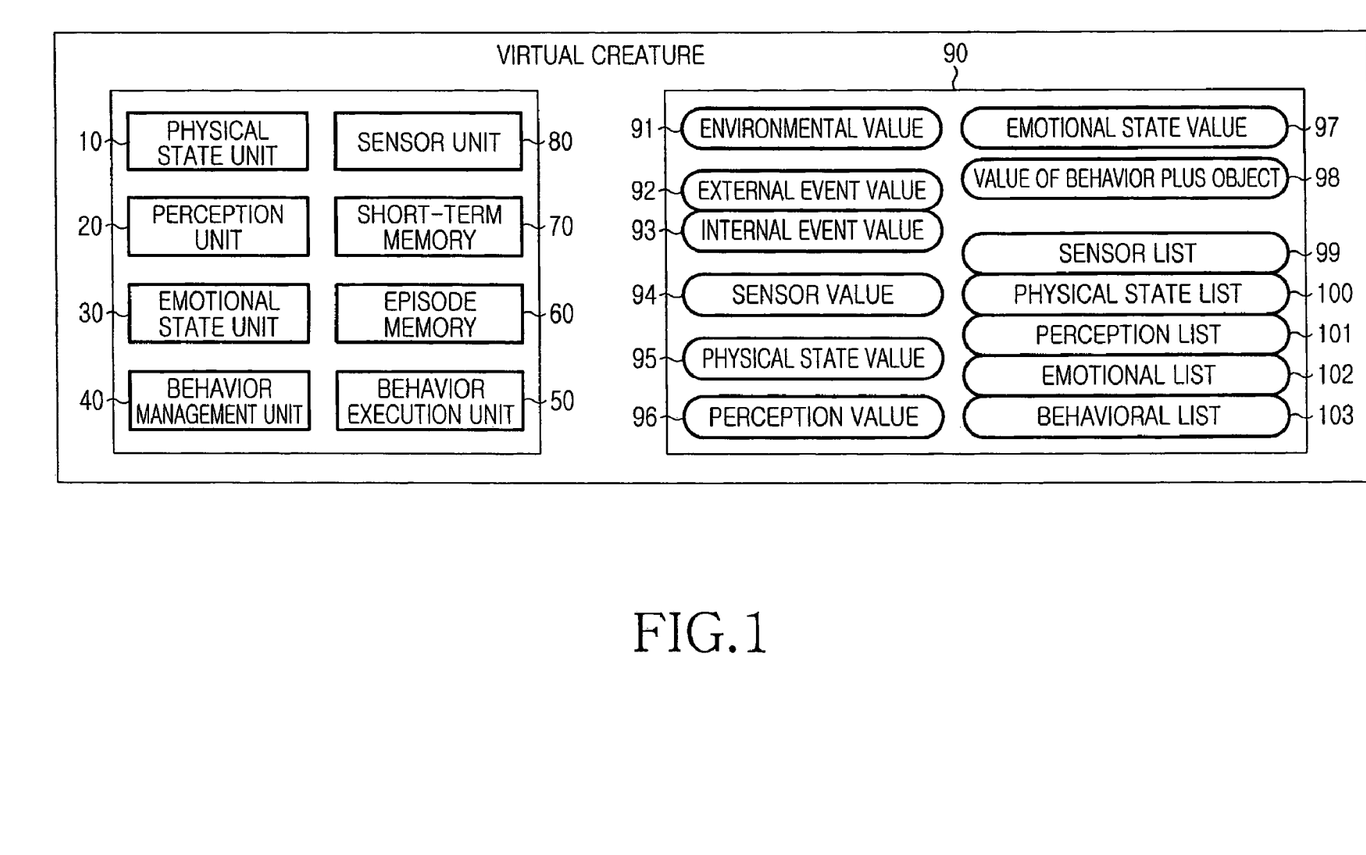
FIG. 1 is a diagram illustrating the configuration of a software robot according to an embodiment of the present invention.

According to an embodiment of the present invention, the abovementioned software robot can be configured as illustrated in FIG. 1, which is a diagram illustrating the configuration of a software robot according to an embodiment of the present invention. With reference to FIG. 1, the software robot includes a physical state unit 10, a perception unit 20, an emotional state unit 30, a behavior management unit 40, a sensor unit 80, a short-term memory 70, an episode memory 60, a behavior execution unit 50, a blackboard 90, and a memory (not shown).

The software robot is equipped with various modules, such as the physical state unit 10, the perception unit 20, the emotional state unit 30, the behavior management unit 40, the sensor unit 80, and the behavior execution unit 50, and respective modules having relations and exchanging agreed data with one another. If complex relations are not standardized, the form of data exchanged at each relation in an execution step and a method for exchanging the data at each relation in an execution step must be all defined. The blackboard 90 is necessary to overcome the inconvenience. It has a structure in which various modules share the blackboard 90, and is used as a means for unifying various information resources. The structure corresponds to the same concept as when a number of people write the information on a blackboard and share information necessary to one another in order to solve a complex problem. A common data area, which can be referred to as a blackboard, exists in the center of the blackboard 90, and information provided from a plurality of modules is unified. The blackboard 90 is embodied in a C blackboard class. The C blackboard class has various data structures as defined in TABLE 4 below, and the respective data information is provided to the respective modules constructing a virtual creature through a relevant Put function and Get function, or is updated by the respective modules.

TABLE 4

| structures | definitions |
|---|---|
| an environmental value 91 | virtual environmental information delivered to the software robot |
| an external event value 92 | information on a case occurring in the cyberspace |
| an internal event value 93 | information on a case occurring inside the software robot |
| a sensor value 94 | cyberspace information sensed by the software robot |
| a physical state value 95 | the bodily state value of the software robot |
| a cognitive value 96 | cognitive information of the software robot |
| an emotional state value 97 | the dominant emotional value of the software robot |
| a value 98 of behavior plus an object | an action selected so as to manifest itself and an object related to the selected action |
| a sensor list 99 | a sensed list existing in the software robot |
| a physical state list 100 | a physical condition list existing in the software robot |
| a cognitive list 101 | a perceptional list existing in the software robot |
| an emotional list 102 | a list of feelings existing in the software robot |
| a behavioral list 103 | an action-related list existing in the software robot |

The abovementioned sensor unit 80 uses the environmental information and the external event as input information, updates sensor data, and outputs sensor data affecting the software robot to the blackboard 90 with the sensor value 94 as the result. All information in the cyberspace is delivered to the virtual creature in the form of environmental information and external events. However, information that is incapable of being sensed may exist according to the position or the capability of the virtual creature. On this account, the sensor unit 10 acts as a filter that delivers only sensible information among lots of pieces of input information to the inside of the software robot. For example, information on objects located beyond the range of vision of the virtual creature is not included in the sensor values 94, and events having no relations to the software robot among external events are not processed.

The physical state unit 10 changes physical states of the robot, depending on external events, internal events, and environmental information, and outputs the final value to the blackboard 90 as the physical state value 95. Examples of the above physical states, as described in TABLE 5 below, can include a state of the stomach, a state of energy, a state of body wastes, a state of activity, a state of health, a state of growth, and so forth.

TABLE 5

| states | definitions | influence |
|---|---|---|
| a state of the stomach | the amount of food ingested before the food is digested | The state of the stomach affects hunger. |
| a state of energy | the magnitude of energy which is being retained | The state of energy affects whether digestion occurs. |
| a state of body wastes | the amount of excrement which must be excreted | The state of body wastes affects excretion. |
| a state of activity | the power for action | The state of activity affects fatigue. |
| a state of health | the condition of health | The state of health affects activity. |
| a state of growth | the degree of physical growth | The state of growth affects the outward shape of the virtual creature. |

The perception unit 20 corresponds to a module that manages results accompanied by the perception of the software robot concerning the environmental information of the cyberspace and the physical states, senses an external environment through the sensor unit 80, detects an internal state through the physical state value 95, and then outputs a cognitive value 96 to the blackboard 90. For example, if the sensor unit 80 passes information, such as being beaten, by the power having a magnitude of 100, the perception of "feeling a pain" can be accomplished. If the magnitude of retained energy becomes less than 10, the perception of "being hungry" can be attained. According to an embodiment of the present invention, kinds of percept states can be configured as defined in TABLE 6.

TABLE 6

| states | definitions |
|---|---|
| brightness | the brightness of a virtual environment |
| sound | the loudness of a sound generating in the virtual environment |
| taste | the taste degree of ingested food |
| hunger | the degree of hunger |
| fatigue | the degree of fatigue |
| strike | the degree in which the virtual creature is beaten by a case happening in the virtual environment |
| pat | the degree in which the virtual creature is patted by a case occurring in the virtual environment |

The emotional state unit 30 corresponds to a module that manages emotional states of the software robot, changes an emotional state with reference to the cognitive value 96, and outputs a changed emotional state to the blackboard 90 as an emotional state value 97. The emotional states can include happiness, sadness, anger, fear, etc., and the emotional state unit 30 determines, as dominant emotion, an emotional state having the largest value among emotional states.

The short-term memory 70 corresponds to a memory in which information generated for a short time is stored, and centering the position of the software robot, a position in which other objects exist is stored by using three variables, including $\gamma$, $\theta$, and $\phi$, together with time t on the spherical coordinate system.

The behavior management unit 40 corresponds to a module that finally determines the behavior of the software robot, determines behavior with reference to the cognitive value 96, the emotional state value 97, the short-term memory 70, and the episode memory 60, and accordingly, outputs a final value 98 of behavior plus an object to the blackboard 90. The behavior management unit 40 determines behavior, basically referring to the episode memory 60, and if it is inevitable, controls guide behavior induced by a user to manifest itself. The emotional state value 97 does not take part in behavior selection itself, and following the selection of the behavior, affects how to manifest the selected behavior itself. That is, after selecting the behavior of "walking", emotions are used to produce the diversity of behavior, such as "happily walking", "walking with a sulky feeling", and the like. In addition, if the cognitive value 96 and the emotional state value 97 are included in an unstable state range representing unstable states, the behavior management unit 40 reference to the episode memory 60, and determines behavior that must be performed on that account. The abovementioned unstable state range is predetermined as an internal constant of the software robot, and corresponds to the genetic value.

In the abovementioned memory (not shown), the unstable state range and multiple artificial chromosome information which is set in the software robot, are stored. Also, in the memory, various kinds of physical states, percept states, emotional states, and types of actions, all of which are set in the software robot, are stored. Additionally, in the memory, information related either to percept states, to physical states, or to emotional states, which are related, corresponding to respective types of actions, is stored. Furthermore, in the memory, a variation related either to emotional states, or to physical states, which are associated with the type of arbitrary behavior, is stored.

Figure 2:
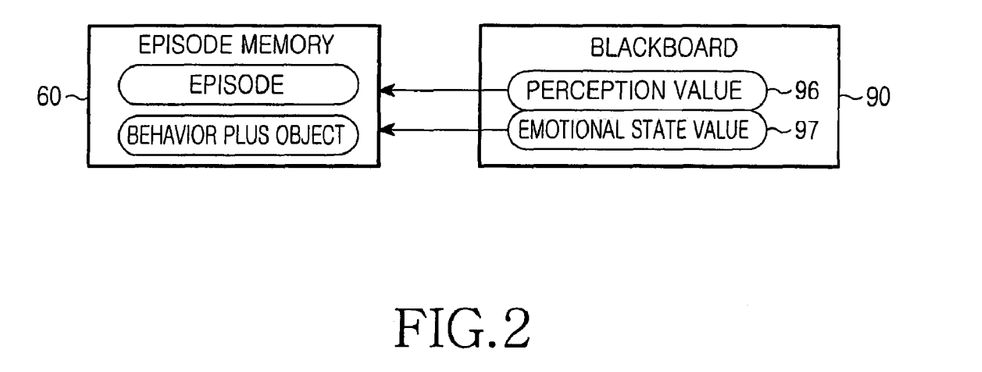
FIG. 2 is a diagram illustrating the relation between an episode memory and a blackboard according to an embodiment of the present invention.

The episode memory 60 corresponds to a module which takes charge of learning related to behavior and perception and behavior and emotional states of the software robot, as illustrated in FIG. 2, refers to the cognitive value 96 and the emotional state value 97, and determines an episode and the value of 98 behavior plus object. FIG. 2 is a diagram illustrating the relation between the episode memory 60 and the blackboard 90 according to an embodiment of the present invention.

Figure 3:
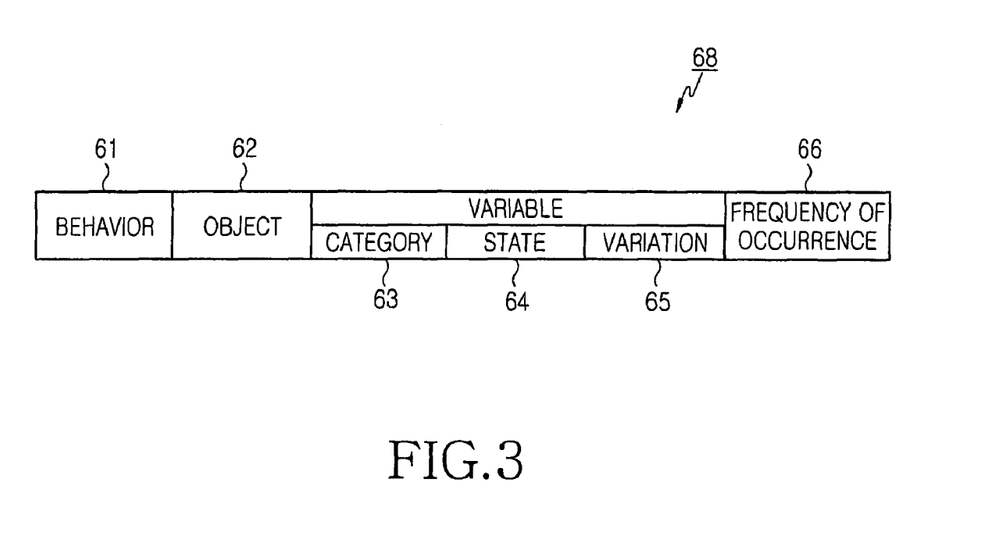
FIG. 3 is a diagram illustrating the structure of an episode stored in the episode memory according to an embodiment of the present invention.

The episode memory 60 is made up of multiple episodes 68, each of which has the structure as illustrated in FIG. 3, which is a diagram illustrating the structure of an episode stored in the episode memory 60 according to an embodiment of the present invention. Each episode 68 corresponds to information representing a combination of each percept state and emotional state, and an object and the type of behavior existing in cyberspace among internal states defined in the software robot, and can express the relation among an action, a percept state, an emotional state and an object, corresponding to each combination. With reference to FIG. 3, the episode 68 includes behavior (i.e., an action) 61 and an object 62, and also includes a category 63, a state 64, a variation 65, and the number of times (i.e., the frequency) of occurrence 66, as variables. The meaning of each piece of information is as defined in TABLE 7 below.

TABLE 7

| elements of an episode | definitions |
| --- | --- |
| behavior (i.e., an action) 61 | unique identification information of selected and manifested behavior |
| an object 62 | unique identification information of an |

TABLE 7-continued

| elements of an episode | definitions |
| --- | --- |
| | object associated with the manifested behavior |
| a category 63 | information representing whether a relevant episode corresponds either to memorization related to a percept state or to memorization related to an emotional state, and has the value of perception or that of emotion. |
| a state 64 | In the state 64, the value of unique identification information of a percept state or the value of unique identification information of an emotional state is stored according to the category, and its initial value equals '0.' |
| a variation 65 | a change in the amount of relevant states |
| the frequency of occurrence 66 | represents how many times a combination of the same behavior, object, and state has been taught and its initial value equals '0.' |

The total number of episodes 68 stored in the episode memory 60 and the corresponding maximum size thereof are fixedly determined depending on the number of percept states, and the number of emotional states, both of which are defined in the software robot, the number of objects existing in cyberspace, and the number of kinds of actions, and a calculation of the total number can be implemented by the following Equation (1).

the total number of episodes=(the number of percept states+the number of emotional states)×the number of kinds of actions×the number of objects  (1)

A process in which the episode 68 is stored in the episode memory 60 is illustrated as in the following. The software robot can manifest a specific action, depending on external events, environmental information, internal states, and a user's inducement. As a result of manifestation of the specific action, an emotional state or a percept state related to the specific action changes. At this time, if kinds of emotional states or percept states associated with the specific action are predetermined regarding a unique artificial chromosome variations of emotional states or percept states associated with the specific action are also predetermined. As the specific action has manifested itself, the episode memory 60 detects the type of the specific action, and can sense an object connected with the specific action, a category, a kind of state, and a variation, which are equivalent to internal states of the software robot, changing in relation to the specific action. The episode memory 60 finds, therein, an episode of the same combination as a combination of the detected type of the action, object, category, kind of the state, and variation. For instance, in a case where the software robot carries out the behavior of "eating an object 1", and the kinds of the states, changing in relation to the object 1, correspond to hunger (its variation: '−10') and happiness (its variation: '+5'), the episode memory 60 finds an episode, consisting of eat—object 1—perception—hunger—(−10), and eat—object 1—emotion—happiness—(5), in relation to the behavior of "eating an object 1." If an episode 68 having the same combination is found, the episode memory 60 detects a variation 65 in the found episode. Then, by using the detected variation 65 and a variation generated due to the above specific action, a representative variation is computed. Since the episode memory 60 has results of learning by behavior, which is stored therein, the variation generated due to the specific action is not stored therein as it stands, but following a computation of the representative variation in which the degree of learning is reflected, the computed representative variation is stored therein. On this account, the detected variation 65 can be regarded as the existing representative variation, and an equation used to compute a representative variation is expressed as defined by the following Equation (2):

$$\text{a representative variation} = (1-p) \times \text{an existing representative variation} + p \times \text{a generated variation} \quad (2)$$

where 'p' represents the degree in which the generated variation affects the representative variation, is predetermined, and has a range of 0<p<1.

Figure 4A:
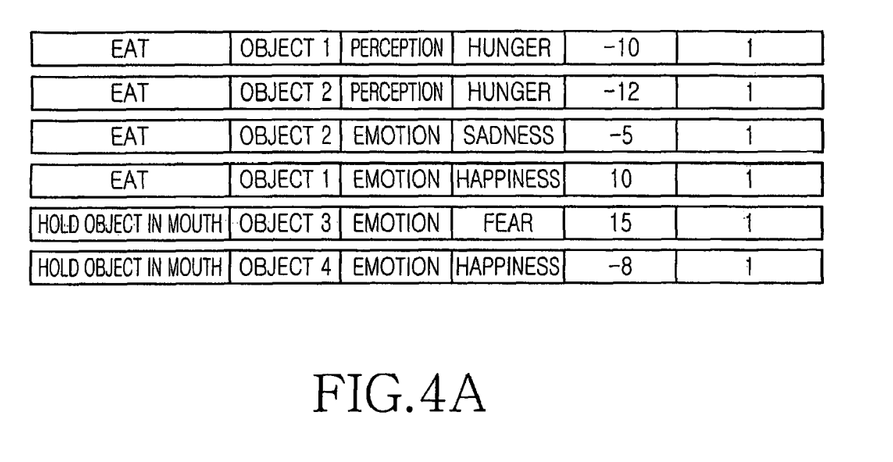
FIGS. 4A to 4C illustrate a process for storing episodes according to an embodiment of the present invention.
Figure 4B:
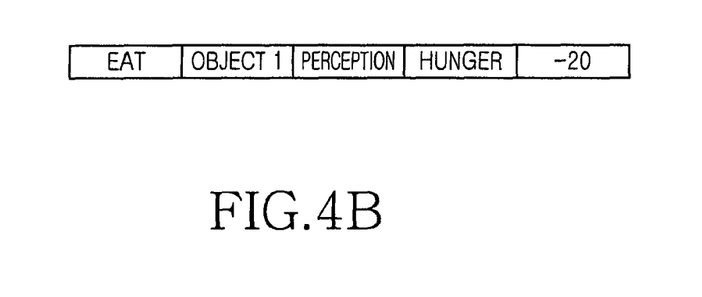

With reference to FIGS. 4A and 4B, description will be made of a process in which a set of episodes 68 is stored in the episode memory 60 in this manner as follows.

FIG. 4A illustrates six episodes stored in the episode memory 60 according to an embodiment of the present invention. Combinations of the six episodes correspond to eat—object 1—perception—hunger—(–10)—1, eat—object 2—perception—hunger—(–12)—1, eat—object 2—emotion—sadness—(–5)—1, eat—object 1—emotion—happiness-(10)-1, hold the object in the mouth-object 3—emotion—fear—(15)-1, and hold the object in the mouth—object 4—emotion—happiness—(–8)—1, respectively. FIG. 4B illustrates a combination of a kind of action, an object, a category, a type of state, and a variation, all of which are perceived in relation to a currently manifested specific action, and the currently manifested action corresponds to "eating the object 1." A state which changes in connection with the action of "eating the object 1" is "hunger", and it is assumed that a variation of the changing state equals '–20.' In addition, it is assumed that the degree in which a generated variation according to the manifested action affects a representative variation equals '0.1.' Accordingly, the episode memory 60 finds an episode having a combination of eat—object 1—perception—hunger—(–20) in relation to the currently manifested action, as illustrated in FIG. 4B. At this moment, the detected episode needs only to match with the combination of the episode corresponding to the currently manifested action only in a kind of action, an object, a category, and a type of state. Among episodes depicted in FIG. 4A, an episode related to the currently manifested action corresponds to the first episode, and accordingly, the episode memory 60 detects '–20' as an existing representative variation. Then, the episode memory 60 computes a representative variation by using the above Equation (2) as follows:

$$\text{the representative variation} = (1-0.1) \times (-10) + 0.1 \times (-20) = -11$$

Figure 4C:
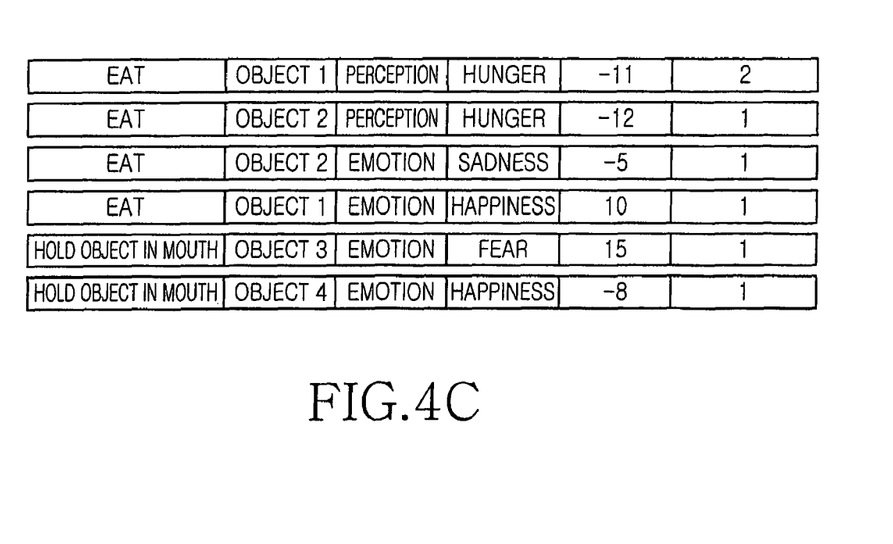
Figure 5:
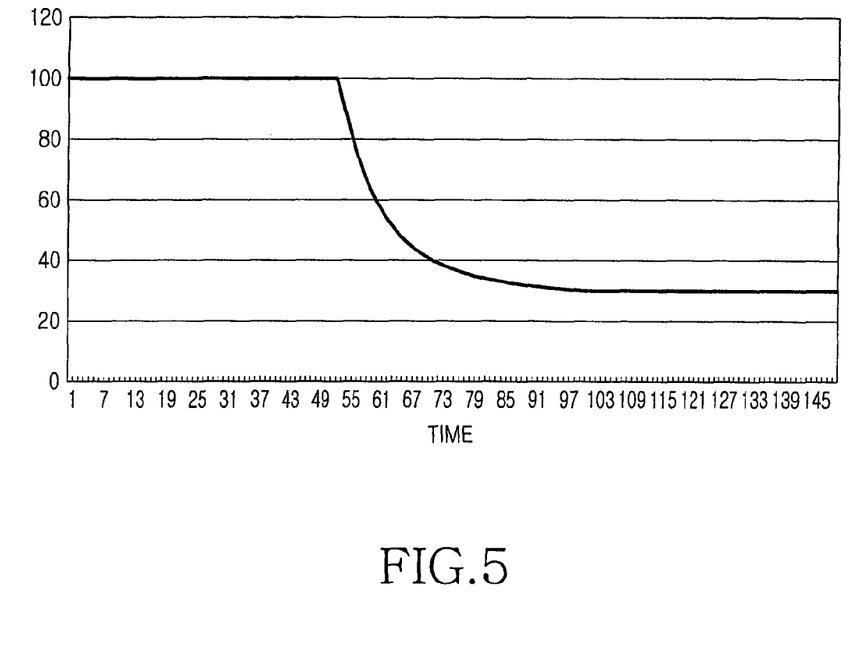
FIG. 5 is a graph showing changes of memorization through behavior learning according to an embodiment of the present invention.

Hence, the episode memory 60 has a new representative variation of '–11' stored in the episode associated with the currently manifested action, as illustrated in FIG. 4C, and has the number of times of publication of '2' stored therein by increasing it by one. The final episode according to this has a combination of eat—object 1—perception—hunger—(–11)—2. In this manner, an example of changes of memorization through learning is illustrated in FIG. 5, which is a graph showing changes of memorization through behavior learning according to an embodiment of the present invention, and which depicts a case where a value that has been memorized as '100' is newly learned as '30.'

To memorize various relations in a small-sized memory, the learning method of the episode memory 60 mentioned above is so conceived that each percept state and each emotional state don't affect each other. Therefore, if a change of each percept state and a change of each emotional state are memorized independently when a certain behavior manifests itself, a quantity of information can be memorized in a small-sized memory. Additionally, the episode memory 60 may be configured so as to be periodically performed. This is because the episode memory 60 memorizes variations of percept states and variations of emotional states, so effective learning can be achieved only if the episode memory 60 is executed at suitable intervals.

As described above, in the present invention, learning of connection relations between the actions and internal states of a software robot can be achieved, and although a user does not give an artificial reward or penalty by means of feedback, the software robot is enabled to sense each input that it is able to perceive as a reward or penalty in regard to learning. In addition, the software robot is enabled to learn even actions related to physical states along with emotional states.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents thereof.

What is claimed is:

1. A method for learning behavior in a software robot, comprising:
   a software robot executing the steps of:
   detecting a kind of at least one object in cyberspace related to a kind of a presently manifested action, and a kind and variation of at least one state among one of percept states and emotional states preset in the software robot so as to change in relation to the kind of the action;
   finding episodes respectively corresponding to each of the at least one object in cyberspace, each of the at least one emotional state and each of the at least one percept state, respectively defined in the software robot, the kind of each of the at least one object in cyberspace related to the detected kind of the manifested action among multiple episodes
   detecting a variation in the found episodes and storing the variation related to each state of at least one state among one of percept states and emotional states preset so as to change in relation to the kind of the manifested action;
   calculating a representative variation, using the variation stored in response to the found episode and the variation detected in response to the manifested action; and
   storing the representative variation as a variation of the found episode.

2. The method as claimed in claim 1, wherein the percept state corresponds to a state reflecting a result accompanied by perceiving environmental information of cyberspace and a physical state of the software robot.

3. The method as claimed in claim 2, wherein the number of multiple episodes is computed by:
   the number of multiple episodes=(the number of percept states+the number of emotional states)×the number of kinds of actions×the number of objects,
   where the number of percept states equals the number of all percept states defined in the software robot,
   the number of emotional states equals the number of all emotional states defined in the software robot,
   the number of kinds of actions equals the number of types of actions defined in the software robot, and
   the number of objects equals the number of all objects existing in the cyberspace.

4. The method as claimed in claim 3, wherein the respective multiple episodes further comprise category information corresponding to related emotional states and related percept states.

5. The method as claimed in claim 4, wherein the respective multiple episodes further comprise information on the number of times of the occurrence of a related action.

6. The method as claimed in claim 4, wherein a process for computing a representative variation by using a variation stored corresponding to the found episode, and a variation generated corresponding to the manifested action is performed by:

a representative variation=$(1-p)\times$an existing representative variation+$p\times$a generated variation, where p represents a degree in which the generated variation affects the representative variation that is predetermined and has a range of $0 \leq p \leq 1$.

7. An apparatus for learning behavior in a software robot, the apparatus comprising:
  a behavior execution unit for implementing an action of the software robot; and
  an episode memory unit,
    for detecting a kind of at least one object in cyberspace related to a kind of the action presently manifested by the behavior execution unit, and a kind and variation of at least one state among one of percept states and emotional states preset in the software robot so as to change in relation to the kind of the action,
    for finding episodes respectively corresponding to: each of the at least one object in cyberspace, each of the at least one emotional state and each of the at least one percept state, respectively defined in the software robot, a kind of an object in cyberspace related to the detected kind of the action among multiple episodes,
    for detecting a variation in the found episodes and storing the variation related to each state of at least one state among one of percept states and emotional states preset so as to change in relation to the kind of the manifested action;
    for calculating a representative variation, using the variation stored in response to the found episode and variation detected in response to the manifested action, and
    for storing the representative variation as a variation of the found episode.

8. The apparatus as claimed in claim 7, wherein the percept state corresponds to a state reflecting a result accompanied by perceiving environmental information of cyberspace and a physical state of the software robot.

9. The apparatus as claimed in claim 8, wherein the episode memory computes the number of multiple episodes as defined by:
  the number of multiple episodes=(the number of percept states+the number of emotional states)×the number of kinds of actions×the number of objects,
  where the number of percept states equals the number of all percept states defined in the software robot,
  the number of emotional states equals the number of all emotional states defined in the software robot,
  the number of kinds of actions equals the number of types of actions defined in the software robot, and
  the number of objects equals the number of all objects existing in the cyberspace.

10. The apparatus as claimed in claim 9, wherein the respective multiple episodes further comprise category information corresponding to related emotional states and related percept states.

11. The apparatus as claimed in claim 10, wherein the respective multiple episodes further comprise information on the number of times of the occurrence of a related action.

12. The apparatus as claimed in claim 11, wherein the episode memory performs a process for computing a representative variation by using a variation stored corresponding to the found episode, and a variation generated corresponding to the manifested action as defined by:

a representative variation=$(1-p)\times$an existing representative variation+$p\times$a generated variation, where p represents the degree in which the generated variation affects the representative variation that is predetermined and has a range of $0 \leq p \leq 1$.

* * * * *